United States Patent
Xing et al.

(10) Patent No.: US 9,933,769 B2
(45) Date of Patent: Apr. 3, 2018

(54) ADAPTIVE MULTI-STAGE DISTURBANCE REJECTION

(71) Applicant: Seagate Technology LLC, Cupertino, CA (US)

(72) Inventors: Zhiqiang Xing, Edina, MN (US); Lou Supino, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 290 days.

(21) Appl. No.: 14/797,674

(22) Filed: Jul. 13, 2015

(65) Prior Publication Data

US 2017/0017216 A1    Jan. 19, 2017

(51) Int. Cl.

| | |
|---|---|
| G01M 1/38 | (2006.01) |
| G05B 13/00 | (2006.01) |
| G05B 15/00 | (2006.01) |
| G05D 23/00 | (2006.01) |
| G05B 19/042 | (2006.01) |

(52) U.S. Cl.
CPC .. G05B 19/042 (2013.01); *G05B 2219/37435* (2013.01)

(58) Field of Classification Search
CPC .................................... G05B 19/042
USPC ........................................ 700/275
See application file for complete search history.

(56) References Cited

U.S. PATENT DOCUMENTS

| | | | |
|---|---|---|---|
| 7,375,916 B2 | 5/2008 | Semba et al. | |
| 7,515,373 B1 | 4/2009 | Supino | |
| 7,633,704 B2 | 12/2009 | Supino et al. | |
| 8,406,708 B2 | 3/2013 | Bai et al. | |
| 8,797,673 B2 | 8/2014 | Supino | |
| 2006/0093075 A1* | 5/2006 | Radich | G11B 20/10009 375/341 |
| 2006/0109585 A1* | 5/2006 | Lee | G11B 5/5552 360/77.02 |
| 2007/0183076 A1 | 8/2007 | Baugh et al. | |
| 2007/0217052 A1* | 9/2007 | Semba | G11B 19/04 360/75 |
| 2009/0268340 A1* | 10/2009 | Supino | G11B 5/5582 360/77.14 |
| 2010/0268354 A1* | 10/2010 | Takaishi | G11B 5/5582 700/37 |
| 2012/0220843 A1 | 8/2012 | Diab et al. | |
| 2012/0320471 A1* | 12/2012 | Supino | G11B 5/5582 360/75 |
| 2013/0286955 A1 | 10/2013 | Morinaga et al. | |

\* cited by examiner

*Primary Examiner* — Mohammad Ali
*Assistant Examiner* — Md Azad
(74) *Attorney, Agent, or Firm* — Hall Estill Attorneys at Law (57) ABSTRACT

Apparatus and method for controlling the position of a control object using a multi-stage actuator. A multi-stage actuator is provided with first and second actuation stages adapted to position a control object. A control circuit includes a multi-tap lattice structure and parallel first and second multiple regression filters coupled to respective taps of the multi-tap lattice structure. The control circuit concurrently generates and applies first and second disturbance rejection signals to the respective first and second actuation stages to compensate a disturbance signal component in a position error signal (PES) indicative of position error of the control object.

18 Claims, 5 Drawing Sheets

ADAPTIVE MULTI-STAGE DISTURBANCE REJECTION

SUMMARY

Various embodiments of the present disclosure are generally directed to an apparatus and method for multi-stage closed loop control, and more particularly, to a disturbance rejection system for a multi-stage actuator.

In some embodiments, a multi-stage actuator is provided with first and second actuation stages adapted to position a control object. A control circuit includes a multi-tap lattice structure and parallel first and second multiple regression filters coupled to respective taps of the multi-tap lattice structure. The control circuit concurrently generates and applies first and second disturbance rejection signals to the respective first and second actuation stages to compensate a disturbance signal component in a position error signal (PES) indicative of position error of the control object.

In other embodiments, a data storage device includes a rotatable data recording medium, and a multi-stage actuator which supports a data transducer adjacent the medium. The multi-stage actuator has a first stage actuator to provide coarse positional control of the transducer and a second stage actuator to provide fine positional control of the transducer. A first stage controller generates a first controller input for the first stage actuator responsive to a position error signal (PES) indicative of position error of the transducer with respect to a selected track on the medium. A second stage controller generates a second controller input for the second stage actuator responsive to the PES. A disturbance sensor detects application of an external disturbance to the data storage device. A disturbance rejection circuit includes a multi-tap lattice structure and parallel first and second multiple regression filters coupled to respective taps of the multi-tap lattice structure. The first multiple regression filter outputs a first disturbance rejection signal which is injected into the first controller input, and the second multiple regression filter outputs a second disturbance rejection signal which is concurrently injected into the second controller input. The first and second disturbance rejection signals are generated responsive to the detected application of the external disturbance by the disturbance sensor.

In further embodiments, a method includes positioning a control object adjacent a target position using a multi-stage actuator comprising first and second actuation stages; detecting an external disturbance that displaces the control object; generating respective first and second disturbance rejection signals responsive to the detected external disturbance using a multi-tap lattice structure and parallel first and second multiple regression filters coupled to respective taps of the multi-tap lattice structure; and applying the first and second disturbance rejection signals to the respective first and second actuation stages to compensate for the displacement of the control object by the external disturbance.

These and other features and aspects of various embodiments can be understood from a review of the following detailed description and the accompanying drawings.

DETAILED DESCRIPTION

Various embodiments of the present disclosure are generally directed to multi-input multi-output (MIMO) closed loop control systems, and more particularly, to a disturbance rejection solution for a multi-stage actuation system such as, but not limited to, the type used in a data storage device servo control system.

Data storage devices are used to store and retrieve computerized data in a fast and efficient manner. Some data storage devices such as hard disc drives (HDDs) utilize a disc stack of one or more rotatable magnetic recording discs. The rotating discs are accessed by a corresponding array of data read/write transducers. Data are written to the recording surfaces of the discs by the transducers in fixed sized data sectors along concentric data tracks. A closed loop digital servo control system is used to control the position of the transducers adjacent the tracks.

Modern HDD applications are finding their way into new consumer applications, which present challenges due to time varying and higher frequency content environmental conditions. As the storage capacity of HDDs continues to increase, so does the track density which places tighter constraints on the servo control system. With tracks placed closer together in the radial direction, there is a need to increase positioning accuracy by the servo control system. Additionally, as the base plates and top covers that form the HDD enclosure become thinner, so does the need for more precise positioning control when track following in the presence of external vibration.

Adaptive feed forward techniques have been applied in the past to voice coil motors (VCMs) commonly employed to provide transducer positioning control. While operable, these and other architectures fail to address the difficult challenges posed by current generation applications. Customer chassis vibrations such as due to music and video applications (e.g., speaker induced vibrations in "all in one" type enclosures), cabinet vibrations in multi-device racks, etc., have been found to cause the track follow servo subsystem to significantly deviate the location of a given transducer from track center. This can cause video, music and other data stream disruption in the form of music skipping, video stalling, application non-responsiveness, operating system (OS) crashes, etc.

A rotational vibration (RV) sensor may be used to sense the presence of these and other types of externally produced vibrations. The output of an RV sensor may be corrupted due to a number of factors, such as PCBA (printed circuit board assembly) dynamics. This makes the statistical correlation between RV measurements and position error signal (PES) measurements weaker, which in turn makes fixed shape compensation approaches work poorly in correlating the actual vibrational input to an appropriate vibrational disturbance rejection signal that can be used to compensate (reject) the input external vibration.

This is particularly true in the case where the external vibration is of a random nature rather than being associated with one or a selected number of characteristic frequencies. For example, power line frequencies (e.g., 60 Hz power), fixed rotational frequencies of fans (e.g., 3600 revolutions per minute, rpm), etc. can inject a disturbance signal with a predictable frequency range. Other disturbance sources, however, such as audio speakers, adjacent data storage devices, user environments for portable devices, etc., can provide a broad range of disturbance frequency inputs that vary in terms of frequency, time and/or magnitude. It therefore becomes increasingly difficult to characterize the actual vibration profile in advance.

In addition, customer specified vibration test protocol profiles are being increasingly difficult to meet even with the use of sophisticated track follow controller design techniques (e.g., DOBs, DDOBs, controller switching, etc.), which are often ultimately limited by the well-known "waterbed" effect (e.g., providing improved frequency response in one frequency range of interest causes a degradation of frequency response in another frequency range of interest, much like pressing down on a waterbed in one location causes another portion of the bed to rise).

Some HDDs incorporate multiple input multiple output (MIMO) control systems where multi-stage actuators are used to provide positional control of the transducers adjacent the corresponding data recording surfaces of the discs. A typical multi-stage actuator may include a first stage actuation mechanism, such as but not limited to a voice coil motor (VCM) attached to a rotary actuator to provide course positional control, and a microactuator (uA) attached at a distal end of an actuator arm adjacent the transducer to provide fine positional control. The first stage (e.g., the VCM) may provide control capabilities to sweep the transducer across substantially the entire radial width of the recording surface, and the second stage (e.g., the uA) may provide control capabilities to sweep the transducer across a relatively few (e.g., 5-10) tracks at a given radial location on the recording surface. While operable, disturbance rejection systems to date have not taken full advantage of the dual (or multiple) stage actuation capabilities of these and other forms of actuator in rejection disturbance vibrations.

Accordingly, various embodiments of the present disclosure are generally directed to an apparatus and method for providing improved disturbance rejection in a multi-stage actuator system. In some embodiments, a MIMO adaptive feed forward control system is used whereby a vibration sensor generates a vibration sensor signal input to an adaptive joint process estimator to improve the capability of external disturbance rejection in both settle and track following modes of operation.

The system is particularly suited to provide disturbance rejection in vibration environments that involve changing and unpredictable frequency components. Compensation values are provided to respective elements of the multi-stage actuator system, such as separate compensation values being injected into control inputs supplied to a VCM and to a uA. The control scheme endeavors to minimize (reduce) non-repeatable run out (NRRO) of a position error signal (PES) caused by rotational (angular) and/or linear (translational) vibration applied to the data storage device (or other control system).

By adaptively adjusting the free parameters of the system automatically to match the unknown and time changing disturbance dynamics with the proposed MIMO adaptive joint process estimator using a modified gradient adaptive algorithm, the feed forward correction signals supplied to the VCM and the uA are able to essentially cancel the effects of the external disturbances in a high frequency range and in certain cases reduce the effect of disc modes, which substantially provides increased robustness and enhanced data throughput rate capabilities.

In some embodiments, positional control of an object, such as a data read/write transducer in a data storage device, is provided using a multi-stage actuator having at least first and second actuation stages. In particular embodiments, the data storage device is a hard disc drive (HDD) having one or more rotatable magnetic recording media (discs), and the multi-stage actuator is a rotary actuator having a first stage actuator (e.g., a VCM) and a second stage actuator (e.g., a uA) that collectively provide positioning control to a data transducer using a MIMO (multiple input, multiple output) controller scheme.

A position error signal (PES) is generated to indicate a position error of the transducer (or other control object) with respect to a target position. The PES has a disturbance signal component generated from an external vibration source that has supplied an external vibration to the system. While not limiting, the external vibration profile may be unpredictable and changes over time.

First and second disturbance rejection signals are generated from the PES using a disturbance damper circuit. The damper circuit uses a multi-tap lattice structure and dual parallel regression filters. The outputs from the lattice structures are tap inputs to each of the various stages of the parallel regression filters. One set of regression filters generates the first stage compensation signal (e.g., the compensation signal for the VCM), and another set of regression filters generates the second stage compensation signal (e.g., the compensation signal for the uA).

The first and second compensation signals are thereafter concurrently applied to the respective first and second stages of the multi-stage actuation system to reject the applied external disturbance. The adaptive compensation signals are automatically tailored to the response characteristics of the different stages. For example, higher frequency disturbance compensation may be applied to the uA since the uA is better able to compensate such higher frequency disturbance components, and lower frequency disturbance compensation may be concurrently applied to the VCM which is better able to compensate such lower frequency disturbance components.

Figure 1:
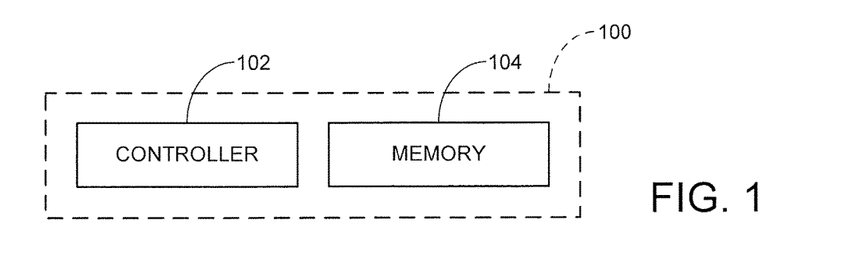
FIG. 1 illustrates a data storage device in accordance with various embodiments of the present disclosure.

These and other features and advantages of various embodiments can be understood beginning with a review of FIG. 1 which provides a simplified functional block diagram of a data storage device 100 in accordance with various embodiments. It will be appreciate that the use of a data storage environment is merely exemplary and is not limiting, as the various embodiments disclosed herein can be readily adapted to any number of different types of multi-stage actuator control systems wherein multiple (e.g., two or more) actuation stages are used to nominally position a control object, of substantially any type, adjacent a target position. In the context of a data storage device, it will be appreciated that the control object may be a data read/write transducer which is positioned adjacent a target track or other target radial location on an adjacent data recording medium surface.

The exemplary data storage device 100 of FIG. 1 includes a controller 102 and a memory module 104. The controller 102 may take the form of a hardware based controller or a software/firmware based programmable processor that utilizes programming steps stored in a suitable memory location to carry out top level control functions for the device 100. The memory module 104 may take any number of suitable forms, including rotatable media, solid-state semiconductor memory, etc.

Figure 2:
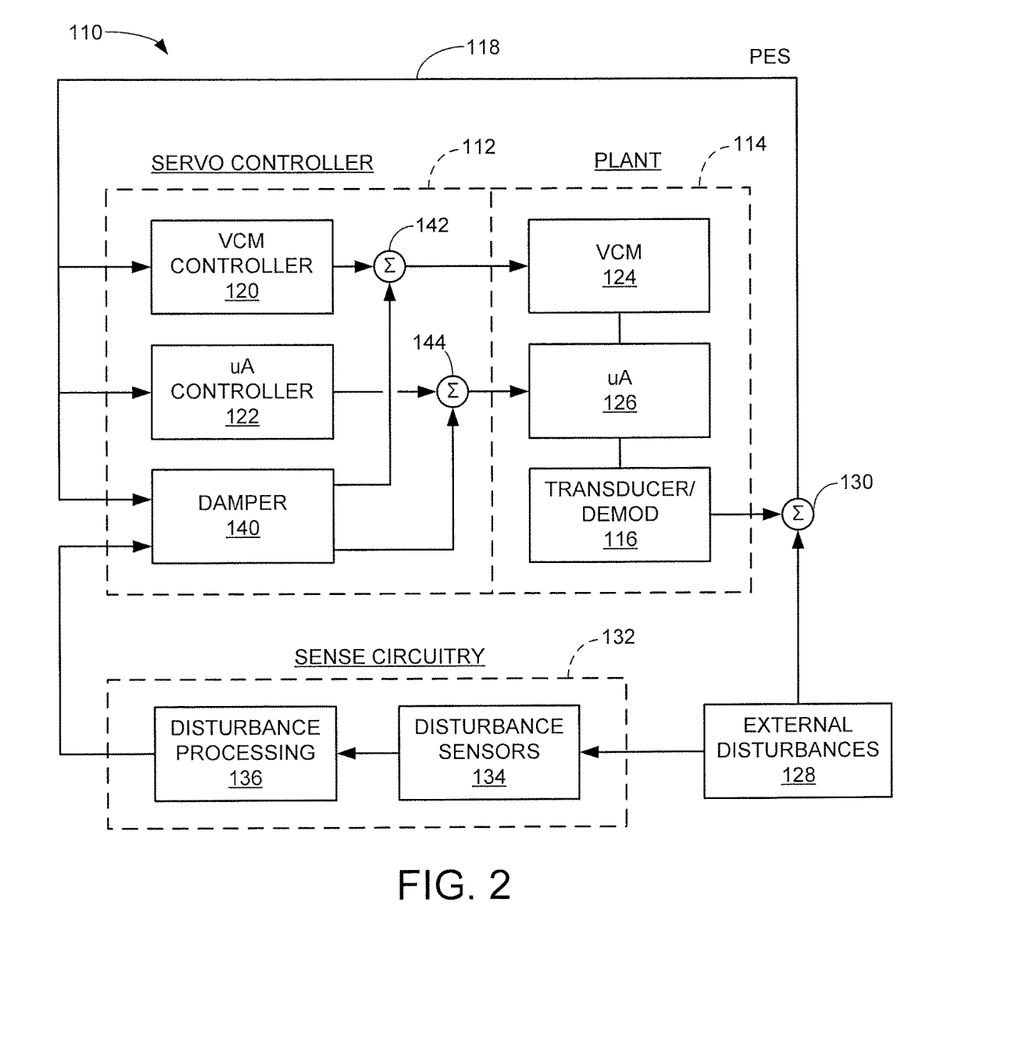
FIG. 2 is a control diagram for a closed loop servo control loop of the device of claim 1 in accordance with some embodiments.

FIG. 2 is a functional block diagram of a closed loop servo control circuit of a data storage device 110 similar to the storage device 100 of FIG. 1. While not limiting, it is contemplated for purposes of the present discussion that the device 110 is a hard disc drive (HDD) data storage device which stores host data on tracks on one or more rotatable magnetic recording media (discs) using a corresponding array of data transducers.

The data transducers are positioned adjacent the discs using a multi-stage (in this case, a dual-stage) actuator. The exemplary actuator supports each of the transducers using a primary actuation stage in the form of a voice coil motor, VCM and a secondary actuation stage in the form of a microactuator, uA. The VCM may include a coil mounted a rotatable actuator body on a side of a pivot point of the actuator opposite the discs (media), and the uA may be supported at the distal end of an actuator arm adjacent the data transducer. Other configurations and arrangements can be used.

As shown in FIG. 2, the device 110 includes a servo controller 112 and a plant 114. The servo controller 112 provides control inputs to the plant 114 to maintain a selected transducer 116 adjacent a target position adjacent a data recording surface. The plant 114 generates a position error signal (PES) on path 118 to indicate a positional error between the commanded (target) position and the actual position. The actual position can be detected in a number of ways, including through the use of servo control data written to the storage media and demodulation and estimation/observer circuitry that estimates or observes the actual position of the transducer 116 based on the detected servo control data from the transducer.

The PES on path 118 is supplied as an input to a VCM controller 120 and a uA controller 122. Each of these controllers 120, 122 generate control inputs to the respective actuation stages of the MIMO multi-stage actuator of the plant 114, including a VCM 124 and a uA 126, respectively, to adjust the position of the transducer. The VCM 124 and uA 126 continuously correct the position the transducer 116 in relation to the target position and the PES in an effort to drive the PES to a value of nominally zero (0) position error. For reference, the solid lines adjoining the respective transducer 116, VCM 124 and uA 126 represent the mechanical coupling of these elements within the actuator.

Block 128 in FIG. 2 represents one or more sources of external vibratory disturbances. These sources of vibratory disturbance can take a variety of forms depending on the application. For example, in the context of a laptop computer in which the data storage device 110 is mounted as an internal HDD to provide main data storage for the system, the external disturbance sources may include speakers (not separately shown) that, when activated to provide an audio input for the user of the laptop, vibrates the chassis in such a way that the vibrations (disturbances) are transmitted to the HDD 110. In another example, a multi-device data storage enclosure may house a population of nominally identical devices that are individually activated, and the operation of adjacent devices (including seek operations to move the transducers to new target locations) may induce translational and/or rotational vibration in adjacent devices.

Other forms of external disturbances can include user induced disturbances (e.g., a user engaged in physical activity while carrying a portable electronic device that incorporates the storage device), disturbances from cooling fans or other vibration sources, and other forms of environmental or system based disturbances. It will be appreciate that the disturbances are unpredictable in the sense that the presence, frequency component and/or duration and magnitude of the disturbances may change over time. It is contemplated that the external disturbances from source(s) 128 may include fixed frequency components and variable frequency components and may constitute a time varying multi-frequency disturbance signal.

It can be seen that the presence of the external disturbances from source(s) 128 have multiple effects on the device 110. In one aspect, the disturbances introduce non-repeatable runout (NRRO) error components directly to the PES. Depending on the style and nature of the disturbances, off-track error may be induced as the transducer and/or the associated disc are displaced by the disturbances. This adds a disturbance component to the PES, as signified by summing junction 130.

A sense circuitry module 132 of the device 110 includes one or more disturbance sensors 134 that detect the applied external disturbances from the source(s) 128. While not separately represented in FIG. 2, it will be appreciated that the sensors 134 may be directly mounted to a base deck or other rigid housing member of the device 110, or may be mounted to a printed circuit board (PCB) or other support member that dampens or otherwise modifies the applied amount of disturbance sensed by the sensors. The sensors 134 can take a variety of forms, including multi-axial piezoelectric transducers (PZTs). Thus, in another aspect the disturbances are sensed by the sensors 134 but through a disturbance path that may amplify or dampen the applied disturbances.

A disturbance processing module 136 conditions the filter output signals by applying filtering and other signal conditioning. In some cases, the disturbance processing block 136 may apply band pass filtering to reject frequencies outside the effective control range of the control loop, as well as analog to digital (ADC) conversion to provide discrete samples of the vibratory input.

A damper circuit 140 receives the PES signals from the plant as well as the filtered disturbance signals from the sense circuitry module 132. As explained below, the damper circuit 140 performs multi-stage LMS adaptive filtering using a lattice structure and parallel regression filters to generate disturbance rejection compensation signals. These compensation signals are respectively injected into the control signals supplied to the VCM 124 and uA 126 using summing junctions 142, 144. As desired, the respective controllers 120, 122 and damper circuit 140 may be incorporated into a digital servo processor or other control module circuit as desired. It has been found that this approach can provide significant disturbance rejection in the presence of a wide range of different disturbance profiles.

Generally, the damper circuit 140 adjusts free parameters automatically based on a joint process estimator (JPE) approach and a least mean squares (LMS) learning algorithm to account for statistical variations in the operational environment.

Figure 3:
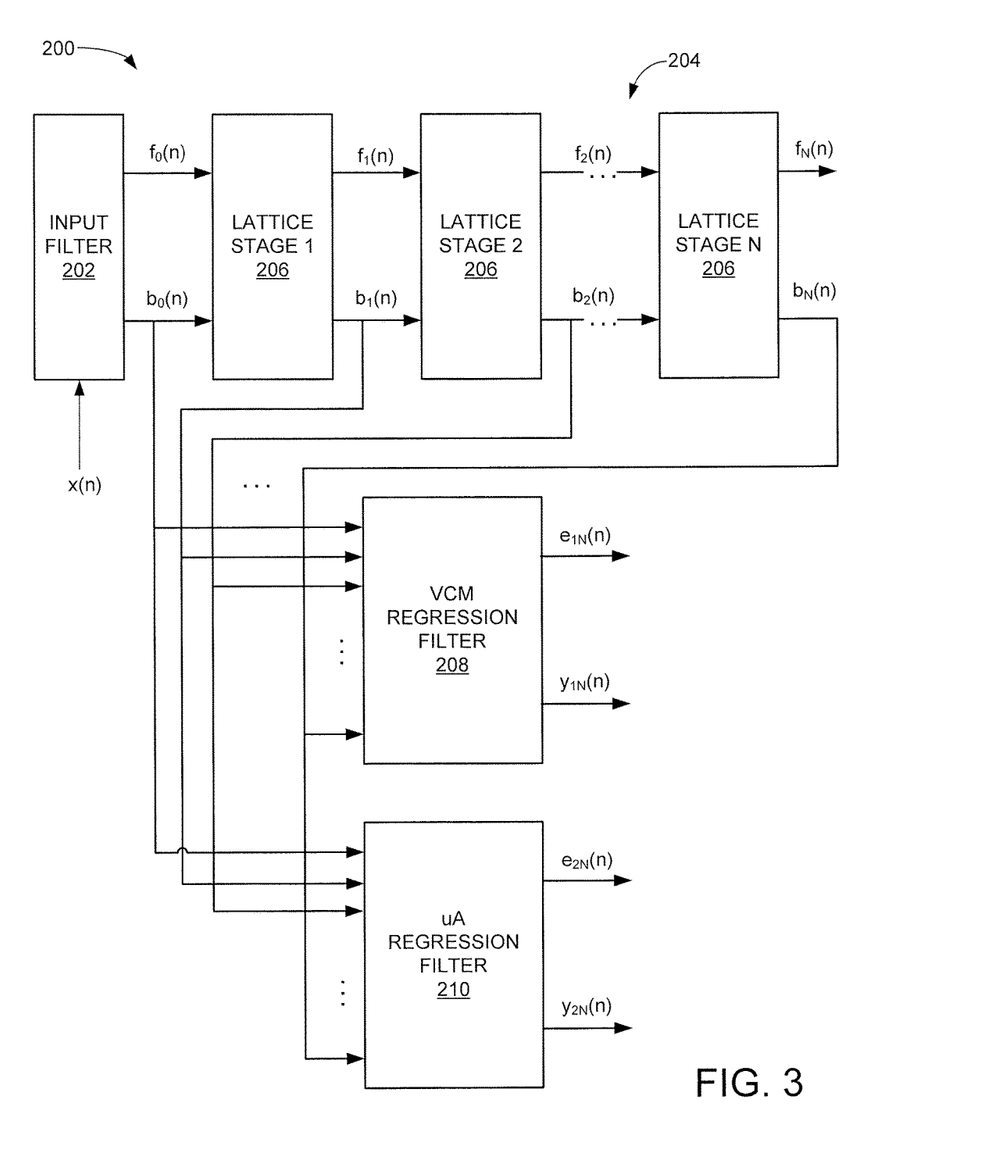
FIG. 3 is a functional block diagram of the disturbance damper circuit of FIG. 2 in accordance with some embodiments.

A filter format suitable for performing the foregoing operations is set forth at 200 in FIG. 3, which generally corresponds to the damper circuit 140 in FIG. 2 in some embodiments. The filter 200 includes an optional input filter 202, an adaptive lattice filter 204 having N stages 206, and a pair of multiple regression filters 208, 210. Each of the regression filters 208, 210 have a corresponding number N stages, although such are not shown in FIG. 3 for simplicity of illustration.

The multiple regression filters 208, 210 are connected in parallel to various taps of the adaptive lattice filter 204 to receive orthogonal prediction error signals from each stage 206. The regression filter 208 provides a first disturbance correction signal to a first stage actuator (in this case, the VCM 124) and the regression filter 210 concurrently provides a second disturbance correction signal to a second stage actuator (in this case, the uA 126). Other arrangements can be used, including multi-stage actuators with more than two actuation stages, with a corresponding regression filter provided for each stage.

In some embodiments, the input filter 202 can be arranged to receive a sensor signal x(n). The filter normalizes the phase of the sensor signal x(n) as necessary. The filter 202 outputs a forward prediction error signal $f_0(n)$ and a backward prediction error signal $b_0(n)$ to the first stage (stage 1) 206 of the lattice structure 204. Each successive stage outputs a new set of orthogonal error signals, from $f_1(n)$ to $f_N(n)$ and from $b_1(n)$ to $b_N(n)$ as shown.

The signals may be processed through the lattice structure 204 in accordance with the so-called Gram-Schmidt Orthogonalization procedure whereby the lattice uses reflection coefficients to split the input signal into N sets of orthogonal signals. Generally, a series of basic functions are supplied to the signals. The first basis function is a normalized version of the input signal, and successive basis functions are located by removing portions of signals that are correlated to previous basis functions. This process is repeated until all basis functions are located.

Each stage of the multiple regression filters 208, 210 receives a separate one of the backward prediction error signals, and applies a regression step to generate a lattice stage error signal $e_i(n)$ and a correction signal $y_i(n)$. Nominally, the final error signal $e_N(n)$ is driven to zero or a nominal value and the final correction signal $y_N(n)$ is output for injection into the appropriate actuation stage.

Figure 4:
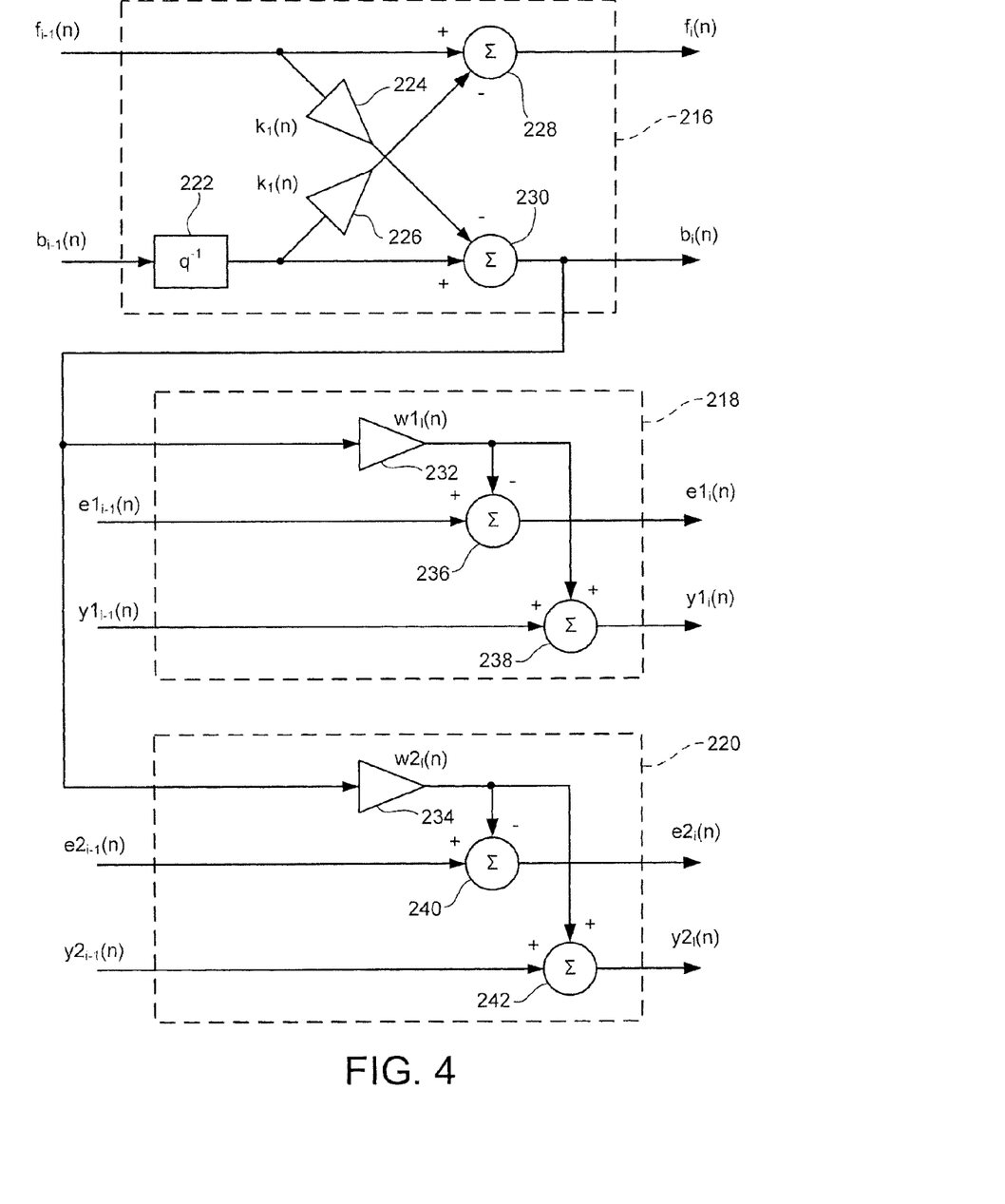
FIG. 4 is a schematic representation of selected stages of the lattice structure and parallel regression filters of FIG. 3.

FIG. 4 shows a single selected lattice stage 216 for the ith stage from FIG. 3, in combination with corresponding regression stages 218, 220 for the ith stage of the regressive filters 208, 210 of FIG. 3. The arrangement in FIG. 4 is merely exemplary and is not limiting.

The ith lattice stage 216 receives input orthogonal forward and backward prediction error signals $f_{i-1}(n)$ and (n) from a previous i−1 stage. Delay block 222, reflection coefficient blocks 224, 226 and summing junctions 228, 230 of lattice stage 216 generate the next set of orthogonal forward and backward prediction errors $f_i(n)$ and $b_i(n)$.

The updated backward prediction error bi(n) is weighted using respective weighting values $w1i(n)$ and $w2i(n)$ of weighting blocks 232 and 234. The weighted outputs from the blocks 232, 234 are combined with the previously generated error values $e1_{i-1}(n)$ and $e2_{i-1}(n)$ and previously generated correction signal values $y1_{i-1}(n)$ and $y2_{i-1}(n)$ from the i−1 regression stages of respective regression filters 208 and 210. Summing junctions 236, 238, 240 and 242 provide the combinations necessary to complete the LMS regression.

Overall, the operation of the system can be described as follows, for each stage:

$$f_i(n) = f_{i-1}(n) - ki(n) * c_{i-1}(n), \quad i=1,2,\ldots,L-1 \quad (1)$$

$$b_i(n) = c_{i-1}(n) - k_i(n) * f_{i-1}(n), \quad i=1,2,\ldots,L-1 \quad (2)$$

$$k_i(n+1) = k_i(n) + \eta_i(n) * [f_i(n) * c_{i-1}(n) + c_i(n) f_{i-1}(n)] \quad (3)$$

$$\eta 1(n) = \eta \hat{P}1(n), \quad 0 < \eta < 1 \quad (4)$$

$$\hat{P}_1(n) = \gamma \hat{P}_1(n-1) - (1-\gamma)[f\{\hat{\gamma}\}(n) - c\{\hat{\gamma}\}(n)] \text{ where } 0 < \gamma << 1$$

$$w_i(n+1) = w_1(n) + \mu_1(n) * b_1(n) * e_1(n) \quad (5)$$

$$\mu 1(n) = \mu \hat{Q}1(n), \quad 0 < \mu < 1 \quad (6)$$

$$\hat{Q}_1(n) = (1-\beta)\hat{Q}_1(n-1) + \beta b_1^2(n), \quad 0 < \beta << 1$$

$$y(n) = \Sigma_i = cL-1 \; w1(n)b1(n) \quad (7)$$

$$\text{InvPwr}(n) = 1B \times \text{InvPwr}(n-1) \times [1 - \min\{\epsilon, 1 - BB \times (f1(n-1)2 - (b1(n-1))2) \times \text{InvPwr}(n-1)\}] \text{ where } \epsilon < 1 \text{ and } \beta = 1 - \eta$$

The value $k_i$ represents the reflection coefficients for the lattice stage 216 (stage i). The value $f_i(n)$ represents the forward, prediction error of the $i^{th}$ stage, $b_i(n)$ represents the backward prediction error of the $i^{th}$ stage, $e1_i(n)$ represents the lattice stage error of the $i^{th}$ stage for regression stage 218, and $e1_i(n)$ represents the lattice stage error of the $i^{th}$ stage for regression stage 220. The lattice stage error values e(n) can be evaluated to determine if it is necessary to add an additional lattice stage to achieve the desired level of disturbance compensation.

While the reflection coefficients $k_i$ are illustrated to be same for the each of the forward prediction error and backward prediction error branches, in an alternate embodiment, different values can be used in each branch. The $y1_i(n)$ output from the regression stage 218 and the $y2i(n)$ output from regression stage 220 represent the filtered outputs from each of these stages. In this way, once the error terms are driven to a sufficiently low value, the output $y1_N(n)$ and $y2_N(n)$ values from the last respective regression stages are forwarded to the respective control inputs to the first and second actuation stages (e.g., VCM and uA, respectively).

It has been found that, generally, while both actuation stages will operate to reject the applied disturbance profile, higher frequency disturbance components will tend to be compensated primarily by the compensation signal supplied to the uA 126 and lower frequency disturbance components will tend to be primarily compensated by the compensation signal supplied to the VCM 124. Each of the regression filters 208, 210 (FIG. 3) operates in parallel on the same inputs from the lattice structure 204 to derive appropriate, adaptive compensation values to drive the overall disturbance induced position error to a minimal level.

Figure 5A:
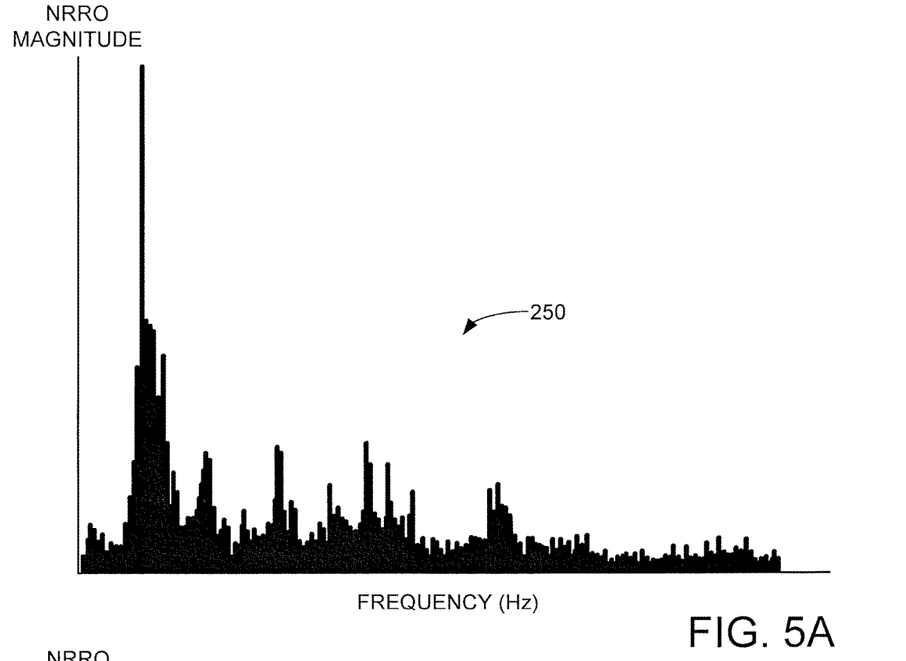
FIGS. 5A and 5B are graphical representation of non-repeatable run out (NRRO) response of the storage device with the damper circuit in a deactivated state and an active stage, respectively.
Figure 5B:
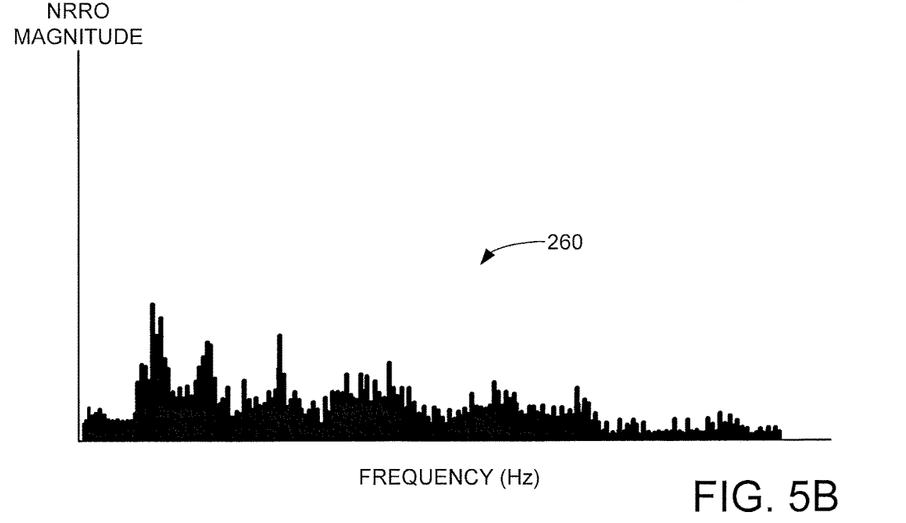

FIGS. 5A and 5B provide graphical representations of plots 250, 260 for non-repeatable run out (NRRO) error observed under different operational conditions for the storage device 110. Both plots 250, 260 are displayed against a frequency x-axis and an NRRO magnitude y-axis of identical scale. Plot 250 represents NRRO error induced by external disturbances with the damper 200 (FIG. 3) in an inactivated state, and plot 260 represents NRRO error induced by external disturbances with the damper 200 in an activated state. By comparing plot 250 and 260, it can be seen that significant reductions in NRRO are provided through the use of the multi-stage adaptive disturbance rejection system 200 of FIG. 3.

Figure 6:
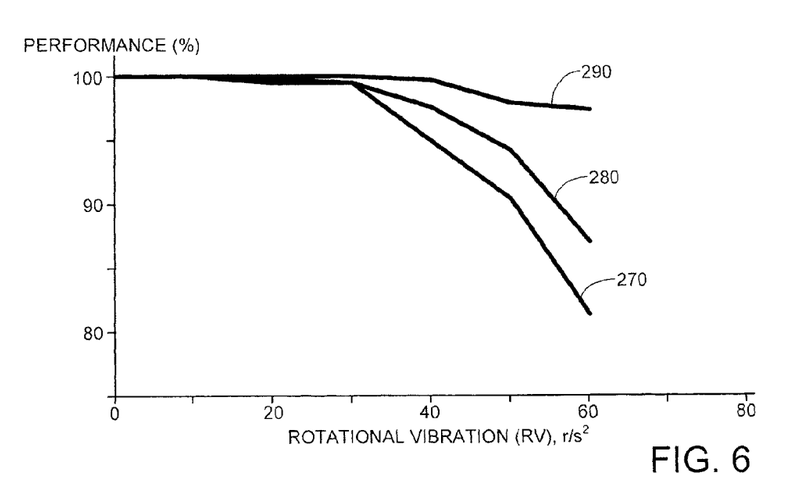
FIG. 6 graphically depicts normalized rotational vibration (RV) rejection performance for different configurations of the storage device of FIG. 2.

FIG. 6 illustrates normalized performance data curves 270, 280 and 290 using a damper circuit such as 200 in FIG. 3. The respective curves generally represent rotational vibration response due to applied external RV disturbances. Curve 270 corresponds to the plot 250 in FIG. 5A in which the damper circuit is in a deactivated stage, so that no disturbance rejection is provided other than that intrinsically provided by the VCM and uA controllers. Curve 280 represents a SISO configuration in which compensation signals are only supplied to the VCM. This can be carried out by, for example, disabling the uA regression filter 210 in FIG. 3. Curve 290 represents a MIMO configuration in which multi-stage disturbance rejection is applied to both the VCM and the uA (e.g., both regression filters 208, 210 are activated).

As can be seen from FIG. 6, both the SISO and MIMO configurations (curves 280 and 290) provide significant disturbance rejection improvement over the baseline system (curve 270), and the MIMO configuration of curve 290 further shows enhanced operation over the SISO configuration of curve 280. Each of these modes (e.g., no active rejection, SISO operation and MIMO operation) can be selectively activated by a top level controller (e.g., controller 102 in FIG. 1), either automatically or responsive to selected inputs. Thus, while it is contemplated in many embodiments that the damper 200 is in a fully active state at all times, in some embodiments the different MIMO, SISO and no compensation modes are selectable for various reasons (e.g., power savings, reducing unnecessary processing complexity, etc.).

Figure 7:
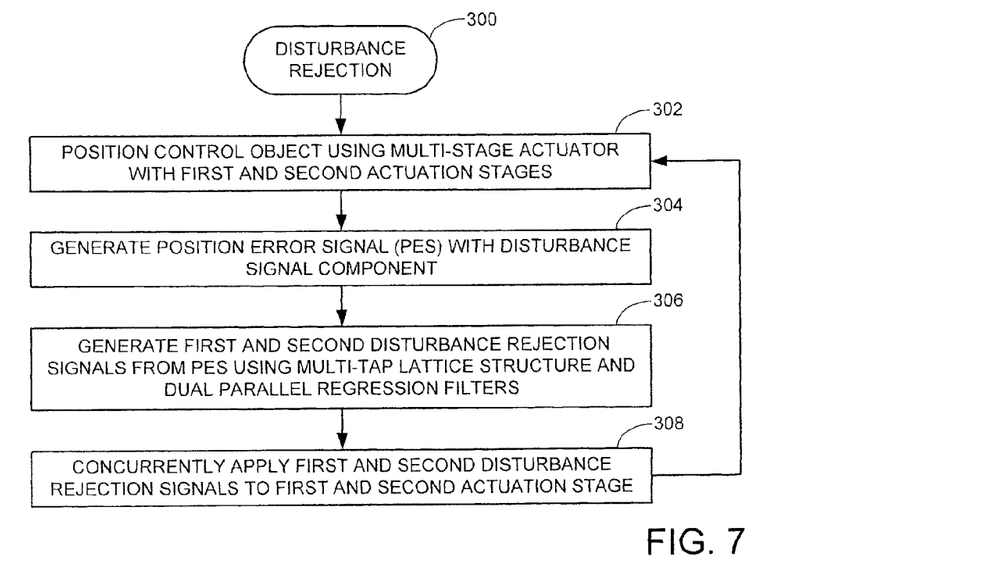
FIG. 7 is a flow chart for a disturbance rejection routine illustrative of steps carried out in accordance with various embodiments of the present disclosure.

FIG. 7 provides a flow chart for a disturbance rejection routine 300 to illustrate steps carried out in accordance with the foregoing discussion. It will be appreciated that the steps in FIG. 7 are merely exemplary and may be modified, appended, omitted and/or performed in a different order. For purposes of illustrating a concrete example, the routine 300 will be discussed in the context of the data storage system 110 of FIG. 2 using a damper circuit 200 as configured in FIGS. 3-4. Such is not limiting as the routine 200 can be adapted to any number of different type of control positioning system environments.

As indicated by step 302, a control object (in this case transducer 116) is positioned using a multi-stage actuator with first and second stages (in this case, VCM 124 and uA 126). A position error signal (PES) is generated at step 304 to indicate a positional error as a distance between the detected position of the transducer and a target position of the transducer. The PES will include a disturbance signal component from an external source, such as discussed above at 128.

First and second disturbance rejection (compensation) signals are generated at step 306 from the PES using a multi-tap lattice structure (such as 204 in FIG. 4) and dual parallel regression filters (such as 208, 210). As noted above, while a dual-stage actuator has been illustrated, any plural number of actuation stages can be provided, with each having its own regression filter. Also as noted above, the disturbance rejection signals are generated using adaptive filtering and regression techniques based on orthogonal forward and backward prediction error signals.

The first and second disturbance rejection signals are concurrently applied at step 308 to the first and second actuation stages to reduce the displacement effects in the position of the control object caused by the disturbance.

It will now be appreciated that the various embodiments disclosed herein may provide a number of benefits. Providing multiple concurrently generated adaptive disturbance compensation signals can enhance disturbance rejection in a variety of environments. While a data storage environment (e.g. HDD environment) has been presented for purposes of providing a concrete example, the techniques disclosed herein can be readily adapted to any number of commercial and industrial applications in which a control object is positioned by a multi-stage actuator, including but not limited to the field of automated equipment in which robotic end effectors are manipulated to control the position of a control object.

Embodiments of the present disclosure have been described with particular reference to the examples illustrated. However, it will be appreciated that variations and modifications may be made to the examples described within the scope of the present disclosure.

What is claimed is:

1. An apparatus comprising:
a multi-stage actuator comprising first and second actuation stages adapted to position a control object, each of the first and second actuation stages having a different frequency response; and
a control circuit comprising a multi-tap lattice structure and parallel first and second multiple regression filters, the multi-tap lattice structure comprising a sequence of N lattice stages connected in series to provide a corresponding set of N taps between respective pairs of the N lattice stages where N is a plural number, each lattice stage in the sequence generating a corresponding set of orthogonal forward and backward prediction error signals based on an input from a previous lattice stage in the sequence, each of the first and second multiple regression filters connected to each of the N taps, the control circuit adapted to concurrently generate and apply first and second disturbance rejection signals to the respective first and second actuation stages to compensate a disturbance signal component in a position error signal (PES) indicative of position error of the control object;
wherein a first stage controller which generates a first controller signal for the first actuation stage responsive to the PES and a second stage controller which generates a second controller signal for the second actuation stage responsive to the PES, wherein the first disturbance rejection signal is combined with the first controller signal to generate a first modified controller signal which is input to the first actuation stage, and wherein the second disturbance rejection signal is combined with second first controller signal to generate a second modified controller signal which is input to the second actuation stage, the first and second modified controller signals adapted to minimize the disturbance signal component in the PES.

2. The apparatus of claim 1, wherein the first multiple regression filter outputs the first disturbance rejection signal for injection into a first controller signal applied to the first actuation stage and the second multiple regression filter outputs the second disturbance rejection signal for injection into a second controller signal applied to the second actuation stage.

3. The apparatus of claim 1, wherein the PES is generated responsive to a difference between an actual position of the control object and a target position of the control object, and wherein the disturbance signal component of the PES is induced by an external disturbance source coupled to the apparatus along a disturbance path.

4. The apparatus of claim 1, further comprising a disturbance sensor which senses a vibratory input from an external disturbance source through a disturbance path between the sensor and the external disturbance source and outputs a characterization of the sensed vibratory input which is applied to the multi-tap lattice structure.

5. The apparatus of claim 1, wherein each of the first and second regression filters receives the backward prediction error signals from each of the N taps of the lattice structure.

6. The apparatus of claim 5, wherein each of the first and second multiple regression filters comprises a corresponding sequence of N regression stages, each ith regression stage receiving as an input the backward prediction error signals from the corresponding ith lattice stage in the multi-tap lattice structure where $1 \leq i \leq N$.

7. The apparatus of claim 1, wherein the control object is a data transducer adjacent a rotatable data recording medium, the first actuation stage comprises a voice coil motor (VCM) having a first frequency response, the second actuation stage comprises a microactuator (uA) adjacent the data transducer having a different, second frequency response, and the PES indicates position error between a position of the transducer and a track on the rotatable data recording medium.

8. A data storage device comprising:
    a rotatable data recording medium;
    a multi-stage actuator which supports a data transducer adjacent the medium and which comprises a first stage actuator with a first frequency response to provide coarse second frequency response to provide fine positional control of the transducer;
    a first stage controller which generates a first controller input for the first stage actuator responsive to a position error signal (PES) indicative of position error of the transducer with respect to a selected track on the medium;
    a second stage controller which generates a second controller input for the second stage actuator responsive to the PES;
    a disturbance sensor adapted to detect application of an external disturbance to the data storage device; and
    a disturbance rejection circuit comprising a multi-tap lattice structure and parallel first and second multiple regression filters, the multi-tap lattice structure comprising a sequence of N lattice stages connected in series to provide a corresponding set of N taps between respective pairs of the N lattice stages where N is a plural number, each lattice stage in the sequence generating a corresponding set of orthogonal forward and backward prediction error signals based on an input from a previous lattice stage in the sequence, each of the first and second multiple regression filters connected to each of the N taps to concurrently receive the backward prediction error signals from the N lattice stages, the first multiple regression filter adapted to output a first disturbance rejection signal which is injected into the first controller input, the second multiple regression filter adapted to output a second disturbance rejection signal which is concurrently injected into the second controller input, the first and second disturbance rejection signals generated responsive to the detected application of the external disturbance by the disturbance sensor;
    wherein the first disturbance rejection signal is combined with the first controller signal to generate a first modified controller signal which is input to the first actuation stage, and wherein the second disturbance rejection signal is combined with second first controller signal to generate a second modified controller signal which is input to the second actuation stage, the first and second modified controller signals adapted to minimize the disturbance signal component in the PES.

9. The apparatus of claim 8, wherein the first stage actuator comprises a voice coil motor (VCM) configured to reject higher frequency disturbances, and the second stage actuator comprises a microactuator (uA) configured to reject lower frequency disturbances.

10. The apparatus of claim 9, wherein each of the first and second multiple regression filters comprises a corresponding sequence of N regression stages, each ith regression stage receiving as an input the backward prediction error signals from the corresponding ith lattice stage in the multi-tap lattice structure where $1 \leq i \leq N$.

11. The apparatus of claim 8, wherein the disturbance rejection circuit further comprises an input filter which applies a normalization operation to the PES and outputs a set of normalized orthogonal forward and backward prediction errors to a first stage of the multi-tap lattice structure.

12. A method comprising:
    positioning a control object adjacent a target position using a multi-stage actuator comprising first and second actuation stages each having a different frequency response;
    detecting an external disturbance that displaces the control object;
    generating respective first and second disturbance rejection signals responsive to the detected external disturbance using a multi-tap lattice structure and parallel first and second multiple regression filters coupled to respective taps of the multi-tap lattice structure, the multi-tap lattice structure comprising a sequence of N lattice stages connected in series to provide a corresponding set of N taps between respective pairs of the N lattice stages where N is a plural number, each lattice stage in the sequence generating a corresponding set of orthogonal forward and backward prediction error signals based on an input from a previous lattice stage in the sequence, each of the first and second multiple regression filters connected to each of the N taps to concurrently receive and process the backward prediction error signals from the N lattice stages to generate the respective first and second disturbance rejection signals; and
    applying the first and second disturbance rejection signals to the respective first and second actuation stages to compensate for the displacement of the control object by the external disturbance;
    generating a first controller signal for the first actuation stage responsive to a position error signal (PES) indicative of position error of the control object with respect to a target position;
    generating a second controller signal for the second actuation stage responsive to the PES;
    combining the first disturbance rejection signal with the first controller signal to generate a first modified controller signal and applying the first modified controller signal to the first actuation stage; and
    combining the second disturbance rejection signal with the second controller signal to generate a second modified controller signal and concurrently applying the second modified controller signal to the first actuation stage to minimize the disturbance signal.

13. The method of claim 12, wherein the external disturbance is detected using a disturbance sensor which senses a vibratory input from an external disturbance source through a disturbance path between the sensor and the external disturbance source and outputs a characterization of the sensed vibratory input which is applied to the multi-tap lattice structure.

14. The method of claim 12, wherein the first stage actuator comprises a voice coil motor (VCM) configured to reject higher frequency disturbances, and the second stage actuator comprises a microactuator (uA) configured to reject lower frequency disturbances.

15. The method of claim 12, wherein the first and second multiple regression filter comprises a corresponding sequence of N regression stages, each ith regression stage receiving as an input the backward prediction error signals from the corresponding ith lattice stage in the multi-tap lattice structure where $1 \leq i \leq N$.

16. The method of claim 12, wherein the external disturbance has a variable frequency component and the first and second disturbance rejection signals are adaptively generated using least mean squares (LMS) filtering.

17. The method of claim 12, further comprising switching from a multiple input multiple output (MIMO) disturbance rejection mode in which the first and second disturbance rejection signals are generated and applied to the respective first and second actuation stages to a single input single output (SISO) disturbance rejection mode in which the first disturbance rejection signal is generated and applied to the first actuation stage and the second disturbance rejection signal is not applied to the second actuation stage.

18. The method of claim 12, wherein the control object is a data transducer adjacent a rotatable data recording medium, the first actuation stage comprises a voice coil motor (VCM), the second actuation stage comprises a microactuator (uA) adjacent the data transducer, and the PES indicates position error between a position of the transducer and a track on the rotatable data recording medium.

* * * * *